US010200496B2

(12) United States Patent
Karunamurthi et al.

(10) Patent No.: US 10,200,496 B2
(45) Date of Patent: Feb. 5, 2019

(54) USER INTERFACE CONFIGURATION TOOL

(71) Applicants: Kalpana Karunamurthi, Marathahalli (IN); Shyam Prakash, Bangalore (IN); Satish Ramteare, Bangalore (IN); Muktha Hiremath, Bangalore (IN)

(72) Inventors: Kalpana Karunamurthi, Marathahalli (IN); Shyam Prakash, Bangalore (IN); Satish Ramteare, Bangalore (IN); Muktha Hiremath, Bangalore (IN)

(73) Assignee: Successfactors, Inc., San Francisco, CA (US)

( * ) Notice: Subject to any disclaimer, the term of this patent is extended or adjusted under 35 U.S.C. 154(b) by 432 days.

(21) Appl. No.: 14/564,648

(22) Filed: Dec. 9, 2014

(65) Prior Publication Data

US 2016/0162142 A1    Jun. 9, 2016

(51) Int. Cl.
| | |
|---|---|
| G06F 17/21 | (2006.01) |
| G06F 9/54 | (2006.01) |
| H04L 29/08 | (2006.01) |
| G06F 3/0489 | (2013.01) |
| G06F 9/44 | (2018.01) |
| G06F 3/0481 | (2013.01) |
| G06F 8/34 | (2018.01) |
| G06F 8/38 | (2018.01) |

(52) U.S. Cl.
CPC .......... *H04L 67/306* (2013.01); *G06F 3/0481* (2013.01); *G06F 3/04895* (2013.01); *G06F 8/34* (2013.01); *G06F 8/38* (2013.01); *G06F 9/44* (2013.01)

(58) Field of Classification Search
None
See application file for complete search history.

(56) References Cited

U.S. PATENT DOCUMENTS

| | | | | | |
|---|---|---|---|---|---|
| 6,137,483 | A | * | 10/2000 | Kiyono | G06F 17/212 715/234 |
| 6,304,948 | B1 | * | 10/2001 | Motoyama | G06F 21/80 711/144 |
| 7,027,996 | B2 | * | 4/2006 | Levinson | G06Q 10/06311 705/7.26 |

(Continued)

OTHER PUBLICATIONS

Training New Employees PowerPoint Template, Nov. 12, 2012, 7 pages.*
Employee Handbook Workshop, Apr. 30, 2011, 44 pages.*

*Primary Examiner* — Yongjia Pan
(74) *Attorney, Agent, or Firm* — Mintz Levin Cohn Ferris Glovsky and Popeo, P.C.

(57) ABSTRACT

A system, a method, and a computer program product for providing a user interface configuration tool are disclosed. A first user interface containing a presentation is generated. The presentation is generated based on a template stored in a memory and includes a plurality of portions. The presentation is modified based on information stored in the memory. The information relates to at least one user and at least one activity to be performed by the user. A modified presentation is generated for displaying in the first user interface, where the modified presentation is presented in a first format. A second user interface is generated for displaying the modified presentation in the first format. The modified presentation is presented to the user in the second user interface.

15 Claims, 6 Drawing Sheets

(56) References Cited

U.S. PATENT DOCUMENTS

| | | | | |
|---|---|---|---|---|
| 7,359,722 B2* | 4/2008 | Kim | ............ | H04M 1/72552 379/142.15 |
| 7,386,465 B1* | 6/2008 | Friedland | ............ | G06Q 10/06 705/7.21 |
| 7,539,626 B2* | 5/2009 | Smith | ............ | G06Q 10/063114 705/7.23 |
| 7,562,029 B2* | 7/2009 | Majd | ............ | G06Q 10/063114 705/7.15 |
| 7,660,950 B2* | 2/2010 | Miller | ............ | G06F 17/30902 711/133 |
| 7,853,467 B2* | 12/2010 | Aboujaoude | ............ | G06Q 10/06 705/7.11 |
| 8,005,710 B2* | 8/2011 | Vishnumurty | ............ | G06F 17/30289 705/301 |
| 9,659,260 B2* | 5/2017 | Caligor | ............ | G06Q 10/00 |
| 2002/0007300 A1* | 1/2002 | Slatter | ............ | G06Q 10/06311 705/7.13 |
| 2002/0174085 A1* | 11/2002 | Nelson | ............ | H04L 67/36 |
| 2004/0015401 A1* | 1/2004 | Lee | ............ | G06Q 30/02 705/16 |
| 2004/0039627 A1* | 2/2004 | Palms | ............ | G06Q 10/063 705/7.14 |
| 2004/0205515 A1* | 10/2004 | Socolow | ............ | G06F 17/24 715/202 |
| 2005/0234749 A1* | 10/2005 | Attebury | ............ | G06Q 10/02 705/5 |
| 2005/0268279 A1* | 12/2005 | Paulsen | ............ | G06F 8/38 717/110 |
| 2006/0004618 A1* | 1/2006 | Brixius | ............ | G06Q 10/06 705/7.18 |
| 2006/0031091 A1* | 2/2006 | Tarr | ............ | G06Q 10/06311 705/26.1 |
| 2006/0129926 A1* | 6/2006 | Malek | ............ | G06F 17/211 715/255 |
| 2006/0167737 A1* | 7/2006 | Muller | ............ | G06Q 10/06311 705/7.13 |
| 2006/0200763 A1* | 9/2006 | Michaelsen | ............ | G06F 17/217 715/244 |
| 2007/0038812 A1* | 2/2007 | Miller | ............ | G06F 17/30902 711/133 |
| 2007/0055939 A1* | 3/2007 | Furlong | ............ | G06Q 10/10 715/731 |
| 2008/0016575 A1* | 1/2008 | Vincent | ............ | H04L 12/5855 726/26 |
| 2008/0065974 A1* | 3/2008 | Campbell | ............ | G06F 17/248 715/200 |
| 2009/0022474 A1* | 1/2009 | Kubono | ............ | G11B 27/034 386/279 |
| 2009/0043802 A1* | 2/2009 | Appel | ............ | G06Q 10/06 |
| 2009/0088191 A1* | 4/2009 | Norton | ............ | H04L 51/066 455/466 |
| 2009/0100362 A1* | 4/2009 | Sauve | ............ | G06F 8/34 715/765 |
| 2010/0185665 A1* | 7/2010 | Horn | ............ | G06Q 10/107 707/769 |
| 2010/0229085 A1* | 9/2010 | Nelson | ............ | G06Q 10/06 715/255 |
| 2011/0004563 A1* | 1/2011 | Rauber | ............ | G06F 17/211 705/345 |
| 2011/0113182 A1* | 5/2011 | Reyes | ............ | G06F 21/6209 711/102 |
| 2012/0042239 A1* | 2/2012 | O'Brien | ............ | G06F 17/248 715/243 |
| 2012/0102095 A1* | 4/2012 | Campbell | ............ | G06F 17/3089 709/203 |
| 2012/0131445 A1* | 5/2012 | Oyarzabal | ............ | G06F 17/211 715/235 |
| 2012/0159314 A1* | 6/2012 | Schrier | ............ | G06F 17/30905 715/252 |
| 2012/0239451 A1* | 9/2012 | Caligor | ............ | G06Q 10/00 705/7.21 |
| 2012/0330709 A1* | 12/2012 | Khorsheed | ............ | G06Q 10/063114 705/7.15 |
| 2013/0007143 A1* | 1/2013 | Rinard | ............ | G06Q 10/107 709/206 |
| 2013/0097485 A1* | 4/2013 | Oyarzabal | ............ | G06F 17/211 715/235 |
| 2013/0218986 A1* | 8/2013 | Sobhani | ............ | H04L 51/22 709/206 |
| 2014/0113268 A1* | 4/2014 | Dhasmana | ............ | G06Q 10/1091 434/365 |
| 2016/0124909 A1* | 5/2016 | Basson | ............ | G10L 25/27 715/732 |

* cited by examiner

USER INTERFACE CONFIGURATION TOOL

TECHNICAL FIELD

This disclosure relates generally to data processing and, in particular, to a user interface configuration tool.

BACKGROUND

In today's world, many companies rely on software applications to conduct their business. Software application deal with various aspects of companies' businesses, which can include finances, product development, human resources, customer service, management, and many other aspects. Software applications typically operate from servers and can be stored in memory. To use software applications, users typically employ various computing devices. User interfaces provide users with an ability to provide instructions to software applications, interact with other users, and perform various functionalities in furthering their company's business.

User interfaces can include a variety of software tools that can be generated by the corresponding software applications. The tools can assist users with performing their tasks, such as word processing, graphics creation, application development, etc. Oftentimes, existing user interfaces present their users with a complicated web of tools, functionalities, options, etc. that can confuse users and leave them unable to determine or foresee what the final output product of their actions using the user interface could be. Additionally, other users that may be using original users' work product may be confused as well and thus, unable to reap the benefits of the work performed. This can have a significant impact on productivity, efficiency, cost, etc. Thus, there is a need to provide an intuitive user interface that can allow users to configure user interfaces and/or what is being displayed on a user interface based on what the users are seeing.

SUMMARY

In some implementations, a computer-implemented method for providing a user interface configuration tool is discloses. The method can include generating, using a processor coupled to at least one memory, a first user interface containing a presentation, the presentation being generated based on a template stored in the at least one memory and includes a plurality of portions, modifying, using the processor, the presentation based on information stored in the at least one memory, the information related to at least one user and at least one activity to be performed by the user, generating, using the processor, based on the modifying, a modified presentation for displaying in the first user interface, the modified presentation being presented in a first format, and generating, using the processing, a second user interface for displaying the modified presentation in the first format, and presenting the modified presentation to the user.

In some implementations, the current subject matter can include one or more of the following optional features. The modification can include at least one of the following: adding at least one portion to the presentation, deleting at least one portion from the presentation, adding data to at least one portion in the presentation, deleting data from at least one portion in the presentation. At least one portion in the presentation can include at least one of the following: text, graphics, audio, video, a link, and a document.

In some implementations, the first user interface is displayed on a first computing device and the second user interface is displayed on a second computing device. An administrative user using the first computing device can perform the modification to the presentation. A non-administrative user (e.g., a new employee) using the second computing device can be prevented from modifying the presentation.

In some implementations, the template can include a predetermined number of portions (e.g., tiles/slides) of the presentation and can be generated based on the information related to the user.

In some implementations, the generated presentation can be valid during a predetermined time period. Upon expiration of the predetermined time, the generated presentation can be deactivated.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
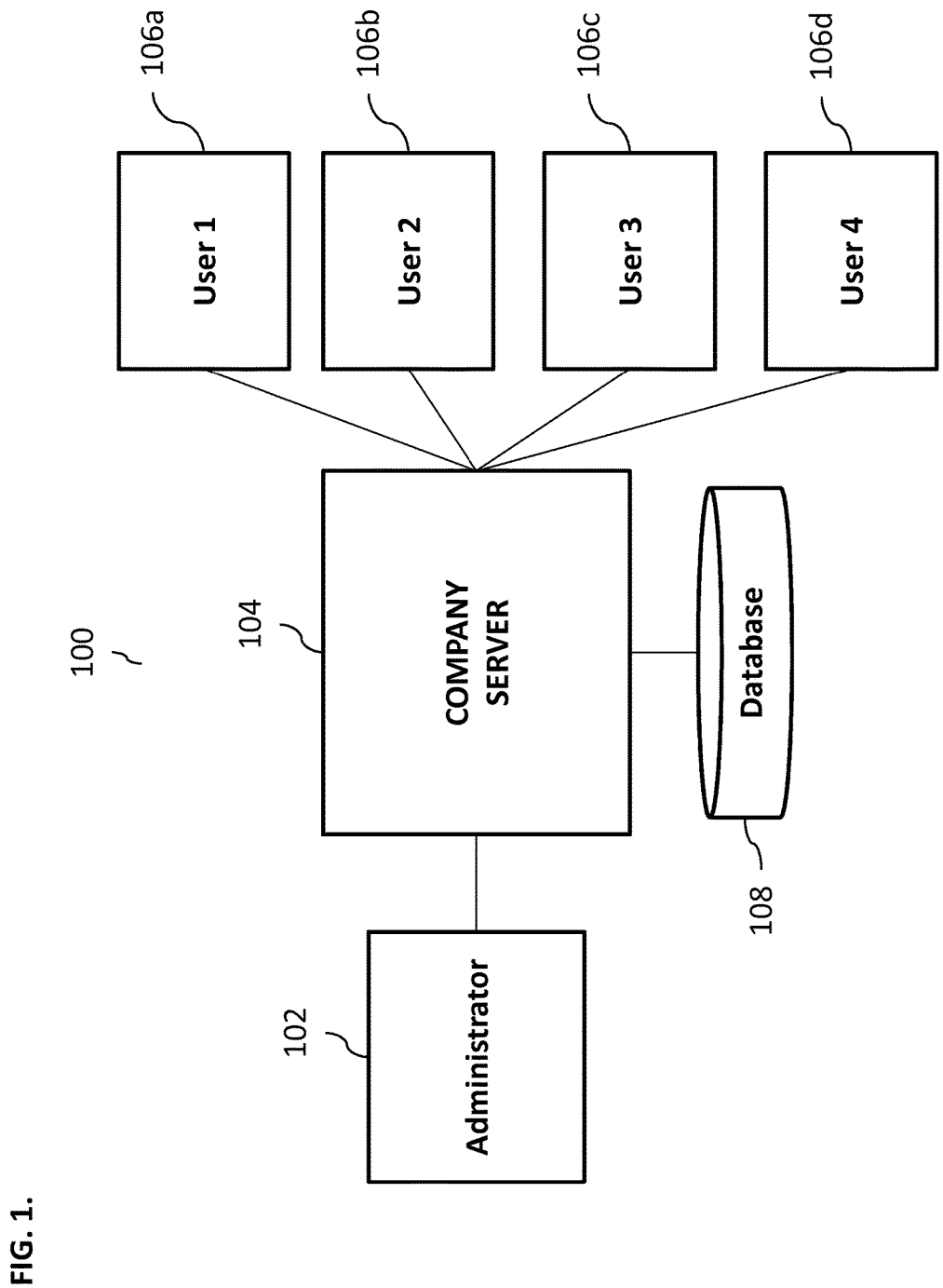
FIG. 1 illustrates an exemplary system that can perform configuration and/or administration of various tasks that can be performed by users, according to some implementations of the current subject matter.

To address these and potentially other deficiencies of currently available solutions, one or more implementations of the current subject matter provide methods, systems, articles or manufacture, and the like that can, among other possible advantages, provide systems and methods for providing a user interface configuration tool.

A user interface can assist a user with an interaction with a computing device (e.g., a personal computer, a laptop, a smartphone, a mobile telephone, a personal digital assistant, a tablet, and/or any other computing device) and can ensure effective operation and control of a computing device by the user. The user interface can also provide a user with a feedback from the computing device, which can aids the user in making various operational decisions. One of the goals of the user interface is to make performance of tasks by the user easier, efficient, enjoyable, etc. so that a desired result can be obtained. In some cases, this can mean that the user may need to provide a minimal input to the computing device in order achieve the desired result, and/or that the computing device minimize number of undesired outputs to the user. Typically, user interface can refer to a graphical user interface that can provide various functionalities to the user such as creation, manipulation, rearrangement, configuration, etc. various data (e.g., text, graphics, business objects, software applications, etc.) using inputs (e.g., a keyboard, a mouse, a touchscreen, etc.) of a computing device. Examples of such functionalities can include creating, sending, reading of an email, creating, modifying, and/or saving of a text document, generating a graphical presentation, etc.

In some implementations, a user interface can provide a user with an ability to administer and/or configure various tasks for a user. An example of such tasks can include configuring and/or administering a "tour" for a new hire that is starting at a company. The tour can be configured and/or administered by a human resources manager and/or an administrator at the company. The tour can include obtaining various information from the new hire (e.g., regulatory forms, tax forms, copies of legal documents, etc.), scheduling meetings with management and/or other existing employees at the company, scheduling trainings (e.g., general and/or specific trainings, etc.) for the employee, setting up employee's office (e.g., setting a physical location, a computer, a telephone, etc.), assigning assistants, etc. The tour can also include a presentation containing a plurality of slides and/or tiles indicative of any of the above information. The current subject matter is not limited to the configuring and/or administering "tours" for newly hired employees at a company, and can be applicable to any field, where an administrator can perform configuration and/or administration of various tasks that can be performed by users. For ease of description and illustration only, the following description is provided with regard to the configuration and/or administration of tasks for a newly hired employee at a company.

In a typical world of administration software, an administrator can be provided with various user interface tools that might not be easy to understand and/or configure. An administrator's job can be affected by trying to determine what impact a certain administrator action in user interface module may have on other tasks and/or actions associated with other user interface modules. Even with the configuration guide and/or other documentation, an administrator may be hard pressed to determine where and how changes made in one administration screen associated with one module can affect the output. In some implementations, the current subject matter can provide a user interface that can allow an administrator and/or other users to have an intuitive user experience that allows ease of administration, configuration, and/or management of user tasks.

FIG. 1 illustrates an exemplary system 100 that can perform configuration and/or administration of various tasks that can be performed by users, according to some implementations of the current subject matter. The system 100 can include an administrator 102, a company server system 104, a database 108, and a plurality of users 106(a, b, c, d). The administrator 102 can be human user using a computing device and/or a computing device that can perform functions, configuration and/or administration automatically. The administrator 102 can be communicatively coupled to the company server system 104, which can in turn be communicatively coupled to the database 108 and the users 106. The company server system 104 can include a computing device and/or a network of computing devices (e.g., servers, computers, mobile devices, etc.). The database 108 can store various data, business objects, business process applications, etc. that can be associated with the company and/or users. The data can include data related to financials, marketing, healthcare, customer service management, employee records, human resources management, etc. and/or any other data that the company can rely on in its day-to-day operations. The users 106 can be company employees, prospective employees, company customers, partners etc.

The administrator 102, the company server system 104, the database 108, and the users 106 can be communicatively coupled using a network, which can be a local area network, a wide area network, an internet, an intranet, an extranet, and/or any other type of network. Access rights to the network can be controlled using various authentication methods (e.g., user name/password, etc.). The administrator 102 can access company server system 104 and/or the database 108 to perform various administration and/or configuration tasks that can be associated with the users 106. The administrator 102 can be granted special privileges and/or access rights to the company server system 104 and/or the database 108. The users 106 can also be provided with appropriate access rights.

In some implementations, the administrator 102 can configure and/or administer and/or maintain various company "tours" for the users of the company. The "tours" can include various programs for newly hired employees (e.g., new employee orientations, trainings, etc.), customer presentations, company trainings, trade presentations, etc. The administrator 102 can accomplish such configuration, administration, and/or maintenance using a user interface. The user interface can be presented to the administrator 102 on the administrator's computing device and can be generated by the company server system 104 using data that can be obtained from the database 108.

In some implementations, the administrator 102 can be provided with a user interface that provides a "what-you-see-is-what-you-configure" ("WYSIWYC") approach to configuring, administering, and/or management of user interface that can be eventually presented to the user 106.

This approach can make this process very intuitive, easy to configure as well as to understand what the impact of the configuration can have on the user interface presented to the user 106. For example, the WYSICWYC approach can be used by a human resources administrator of a company during configuration, administration and/or management of a new hire orientation "tour". In some cases, the new hire orientation tour can be setup and be valid during a limited time period (e.g., 30 days). The administrator can configure various meetings for the new hire (e.g., meeting of employee's managers, administration personnel, co-workers, etc.), attendance of various trainings, presentations, seminars, etc. (in-house and/or external to the company), generate various legal documents for employee to execute/review, as well as any other tasks. In some implementations, the administrator can also define different data sources to fetch content that can be populated in the tour slides. Using the exemplary user interface, the administrator can monitor completion of the tasks by the user. The administrator can setup due dates for each action item. The user can also use the user interface to view what action items (e.g., meetings, trainings, documents, etc.) are still outstanding. In some implementations, the administrator can create a presentation for the user where the above information can be appropriately organized. The administrator can also edit information that has been previously put together for the user.

In some implementations, the administrator can access an administration module that can allow the administer to view a specific "tour", make edits, and/or otherwise configure and/or administer various tasks and/or action items for the user. The user interface content that results from the administrator actions can be viewed by the administrator, whereby the same user interface is presented to the user.

Figure 2:
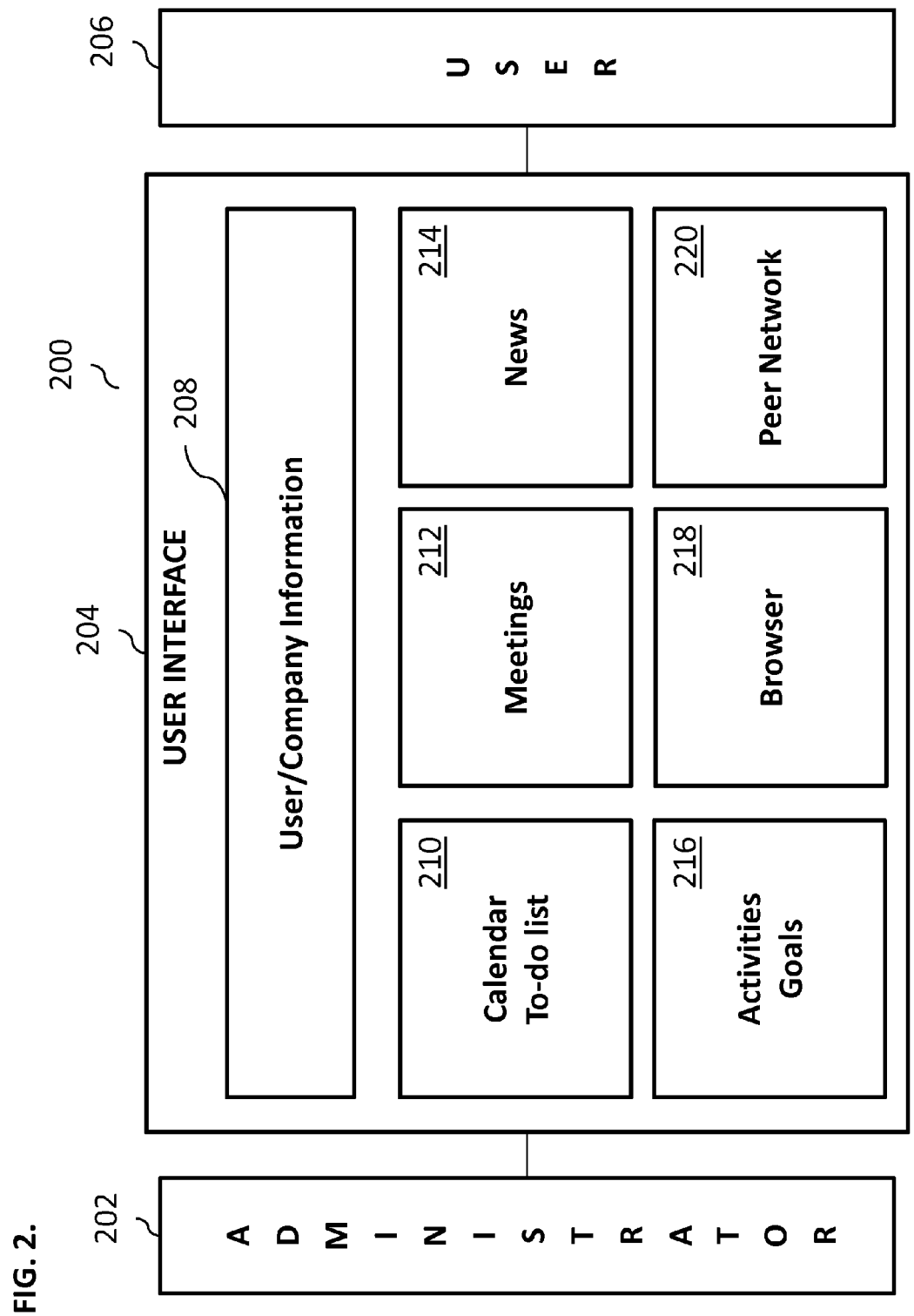
FIG. 2 illustrates an exemplary system that can be used by an administrator to configure and/or administer a tour, according to some implementations of the current subject matter.

FIG. 2 illustrates an exemplary system 200 that can be used by an administrator to configure and/or administer the tour, according to some implementations of the current subject matter. An administrator 202 and/or user 206 can access a user interface 204 that is part of the system 200. The user interface 204 can be hosted by the company server system 104 and can use information stored in the database 108 (as shown in FIG. 1).

The user interface 204 can include various sections that can provide the administrator 202 with an ability to configure, administer, edit, manage, and/or view information displayed in the user interface. In some implementations, the user 206 can also perform various configuration, administration, editing, management, and/or viewing of information displayed on the user interface.

The user interface 204 can include a block 208 that can contain information about the user 206 (e.g., name, address, picture, etc.), a block 210 that can contain a calendar of events and/or a to-do-list for the user 206 to perform, a bock 212 that can contain a schedule of meetings and/or appointments that the user 206 can be requested and/or required to attend, a block 214 can include miscellaneous information for the user 206 (e.g., news, alerts, etc.), a block 216 that can include a list of activities and/or associated goals for the user 206, a block 218 can include a browser that can assist the user 206 in navigating to appropriate information that may be of interest to the user 206, and a block 220 that can include information about user 206 co-workers and/or peers that may be socially and/or professionally associated with the user 206.

The information contained in blocks 208-220 can be obtained from a database 108 (shown in FIG. 1) and/or from any other sources. The information can be inserted automatically and/or manually. In some implementations, the administrator 202 and/or the user 206 can be granted appropriate privileges to access and/or modify information for display in the user interface 204. The information can also be updated based on activities of the administrator and/or the user. For example, the calendar/to-do list block 210 can include information about a task that needs to be completed by the user 206 by a specific time and/or date. Once completed, the user interface 204 can include an underlying code that can determine whether the task has been completed (e.g., by contacting the user and/or administrator to determine whether the task has been completed, by communicating with a third party, a business object, a business process application to determine whether task has been completed, and/or by any other methods)

Figure 3:
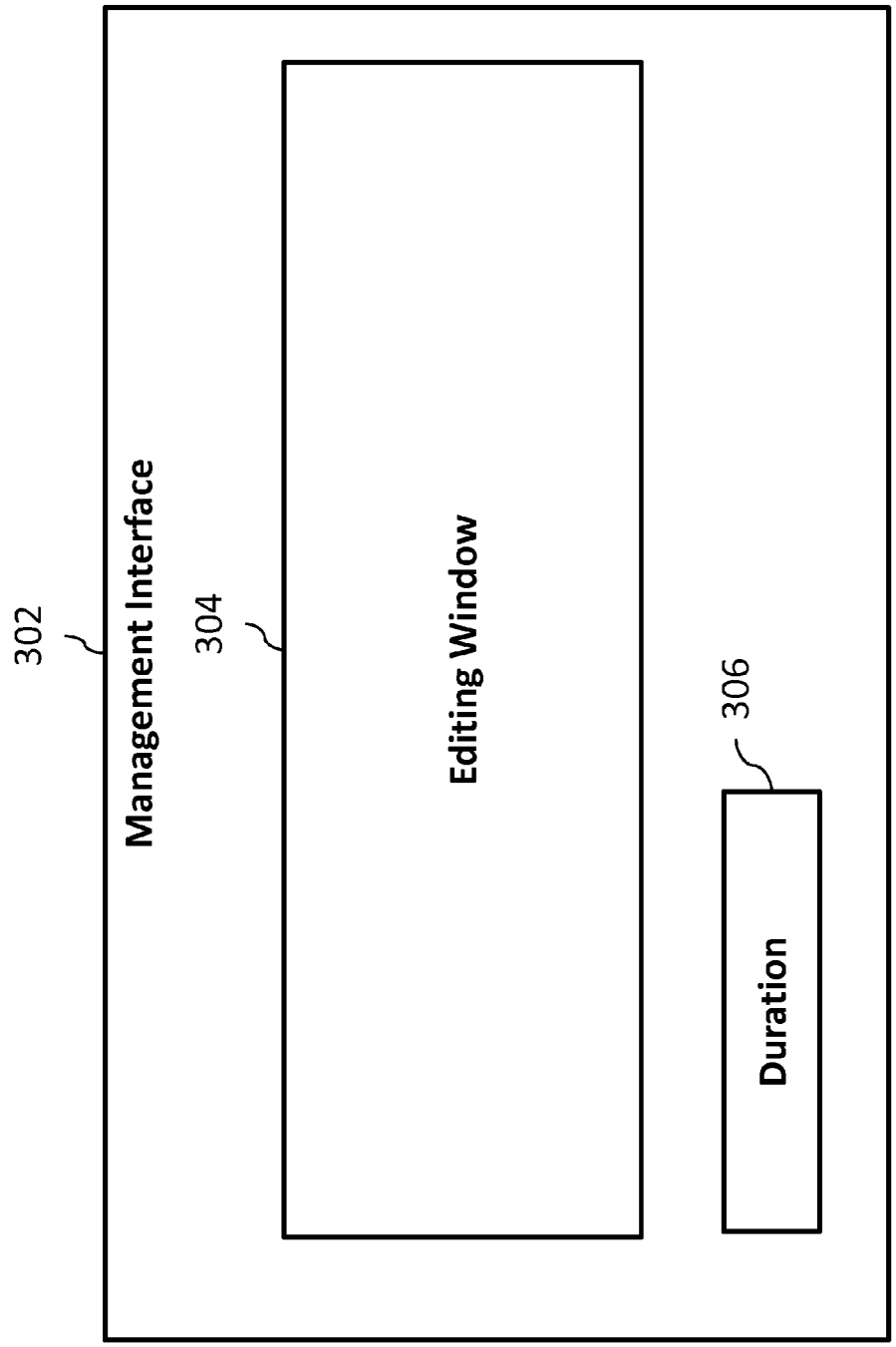
FIG. 3 illustrates an exemplary administrator management user interface that an administrator can use to configure and/or administer a "tour" for one or more users, according to some implementations of the current subject matter.

FIG. 3 illustrates an exemplary administrator management user interface 302 that an administrator can use to configure and/or administer a "tour" for one or more users, according to some implementations of the current subject matter. The user interface 302 can include an editing window 304 and a duration block 306. The user interface 302 can also include a plurality of administrator tools, menus, options, etc. that can allow the administrator to configure and/or administer a tour for user(s). The user interface 302 can also include identification information for the administrator as well as an indication of time when the administrator last accessed the user interface 302. In some implementations, a user, other than the administrator can access the user interface 302 and can make appropriate edits to the tour. In some implementations, information (e.g., a v-card, name, contact information, etc.) about the administrator and/or any other user that have edited the tour can be displayed in the user interface 302. The information can be displayed using a call-out feature of the user interface 302 and/or by opening a separate document containing this information. In some implementations, the user interface 302 can provide an option of selecting a native language for the administrator and/or the user.

In some implementations, the editing window 304 can allow the administrator 302 to view, enter, and/or edit information for the tour. The information in the editing window can be entered for the entire tour and/or a specific slide or tile of the presentation contained in the tour. The content in the tour (and/or slide/tile) can be dynamically generated and/or can be manually entered by the administrator and/or any other user in the editing window 304. The editing window 304 can include a button and/or any other link that the administrator and/or any other user can click to switch between slides/tiles in the tour in order to view, enter, and/or edit information for other sides in the tour. The administrator and/or any other user can enter text, insert media (e.g., audio files, video files, graphics, photographs, etc.), attach documents, insert links to other documents, generate alerts, etc.

In some implementations, the duration block 306 can include information concerning duration of the tour and/or a specific slide/tile in the tour. The tour can be valid for a predetermined amount of time, after expiration of which it is no longer valid and/or can be deactivated. The deactivation can be automatic (e.g., performed by the system 100 upon receiving an appropriate trigger, alert, etc.) and/or manual (e.g., performed by the administrator and/or any other user). When the administrator/any other user indicates a particular duration, such duration is stored by the system 100 (shown in FIG. 1) and any data that may be associated with the created tour has a corresponding validity period.

Figure 4:
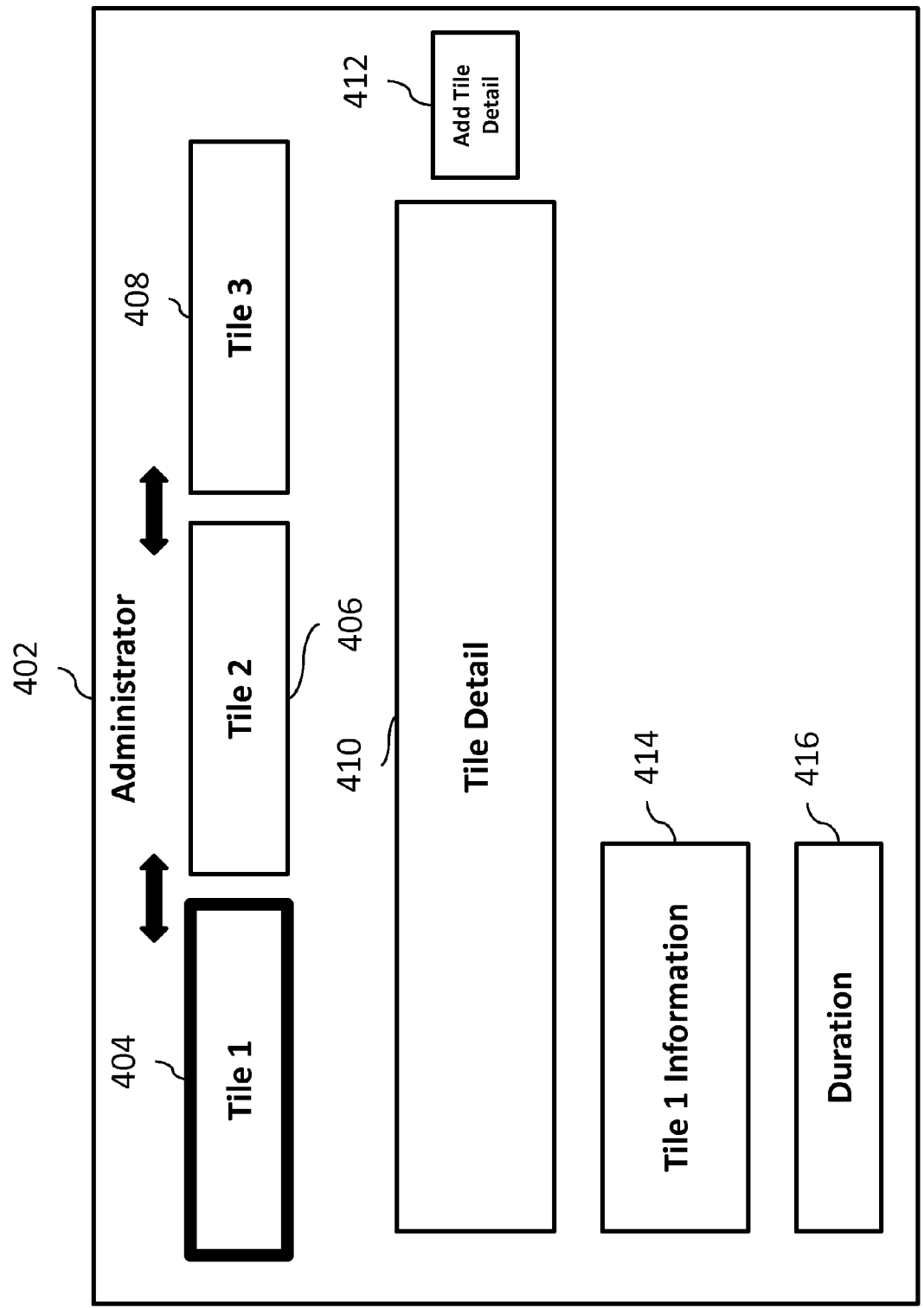
FIG. 4 illustrates another exemplary administrator user interface that can allow the administrator to create, configure, manage, and/or administer a tour and/or tours for one or more users, according to some implementations of the current subject matter

FIG. 4 illustrates another exemplary administrator user interface 402 that can allow the administrator to create, configure, manage, and/or administer a tour and/or tours for one or more users, according to some implementations of the current subject matter. The administrator user interface 402 can include a plurality of tiles 404, 406, 408, a tile detail block 410, a tile information block 414, and a duration block 416. The tiles 404-408 can represent different sections (or slides) of the tour and can provide the administrator with a preview of what information a particular tour slide can contain. In some implementations, the titles 404-408 can be thumbnails, buttons, icons, etc. that the administrator can click or otherwise select to view additional detail contained in the slide. The tiles 404-408 can be listed sequentially corresponding to the order of the respective slides in the tour. In some implementations, the administrator can reorder the tiles (using double-headed arrows shown in FIG. 4), as desired. Such reordering can cause reordering of the corresponding slides in the tour. The tiles can be numbered and the numbering can correspond to the slides in the tour.

In some implementations, by selecting a particular tile, its content can be displayed in the tile detail block 410, e.g., upon selecting "Tile 1" 404 (shown in thicker lines), "Tile Detail" is shown in tile detail block 410, as shown in FIG. 1. For example, the information contained in the tile detail block 410 can relate to the information about the user for whom the tour has been generated, schedule of meetings for that user, documentation to execute by the user, news, etc. In some implementations, the administrator and/or any other user can edit content contained within the tile detail block 410. Content editing can include inserting, deleting, and/or modifying text, media (e.g., video, audio, graphics, photographs, etc.), linking documentation, etc. In some implementations, the administrator and/or any other user can add tile/slide detail using block 412.

In some implementations, the administrator can also add and/or remove tiles from the tour. By adding and/or removing tiles from the tour, corresponding slides can be added and/or removed, respectively.

In some implementations, the tile information block 414 can include information about a tile that has been selected by the administrator and/or any other user. As shown in FIG. 4, since tile 1 404 was selected, the tile 1 information is displayed in the tile information block 414. This information can include information that is contained in the tile as well as in the slide. This can include information about the user for whom the tour has been generated, a schedule of meetings for the user, user's tasks to complete, as well as any other information can be included in a tile and/or a corresponding slide.

The user interface 402 can also include a duration block 416 that can indicate a total duration for the tour. The duration can be indicative of a time period during which the tour is valid. After expiration of the time period, the tour can be deactivated. The deactivation can be done automatically and/or manually by the administrator. In some implementations, the duration block 416 can also indicate a time period during which a particular tile/slide can be valid. A tile can be deleted (either automatically and/or manually) after expiration of that time period. Additionally, a tile can be removed from the tour when a user and/or an administrator takes a particular action that may be described in the tile/slide. For example, a tile/slide can include a link to and call for execution of specific document by the user. Once the user executes the documents and provides them to the administrator (or the appropriate third party), an appropriate notice can be generated to the administrator indicative of the user completing the task designated in the tile/slide. Based on this notice, the tile/slide can be deleted either manually and/or automatically.

In some implementations, the tour can be modified by performing at least one of the following functions: adding a tile/slide, deleting a tile/slide, reordering of a tile/slide, editing content of the tile/slide (attaching attributes, specifying different languages, etc.), highlighting/selecting sections of the user interface, providing callouts, hiding/showing tiles/slides and/or corresponding content based on customer configuration and/or product enablement, editing timetable of the tour and/or its duration, as well as performing any other functions.

In some implementations, tiles/slides can be customized, edited, deleted and/or added. Additionally, attributes (e.g., highlighting of a tile/slide, and/or elements of the web page(s)/application(s), callout(s), etc.) can be edited, deleted, added, and/or modified in the tile/slide and can be displayed along with the tile/slide. The user interface can include an appropriate button, link, and/or other option to make the above changes to the tiles/slides. In some implementations, the user interface can allow the administrator enter content without worrying about formatting, languages, etc. The underlying coding of the user interface can modify the formatting, arrangement, etc. of text, media, etc., on a slide according to preferences that may be set by the administrator. The preferences can include language preferences as well. In some implementations, tile/slide and/or any of its parts can be highlighted, include callouts, network links (e.g., a hypertext transfer protocol ("HTTP") links, etc.), document links, etc. Additionally, the administrator can set a specific theme (e.g., colors, fonts, etc.) for the tour. The theme can be based on the company preferences, letterheads, templates, etc.

Figure 5:
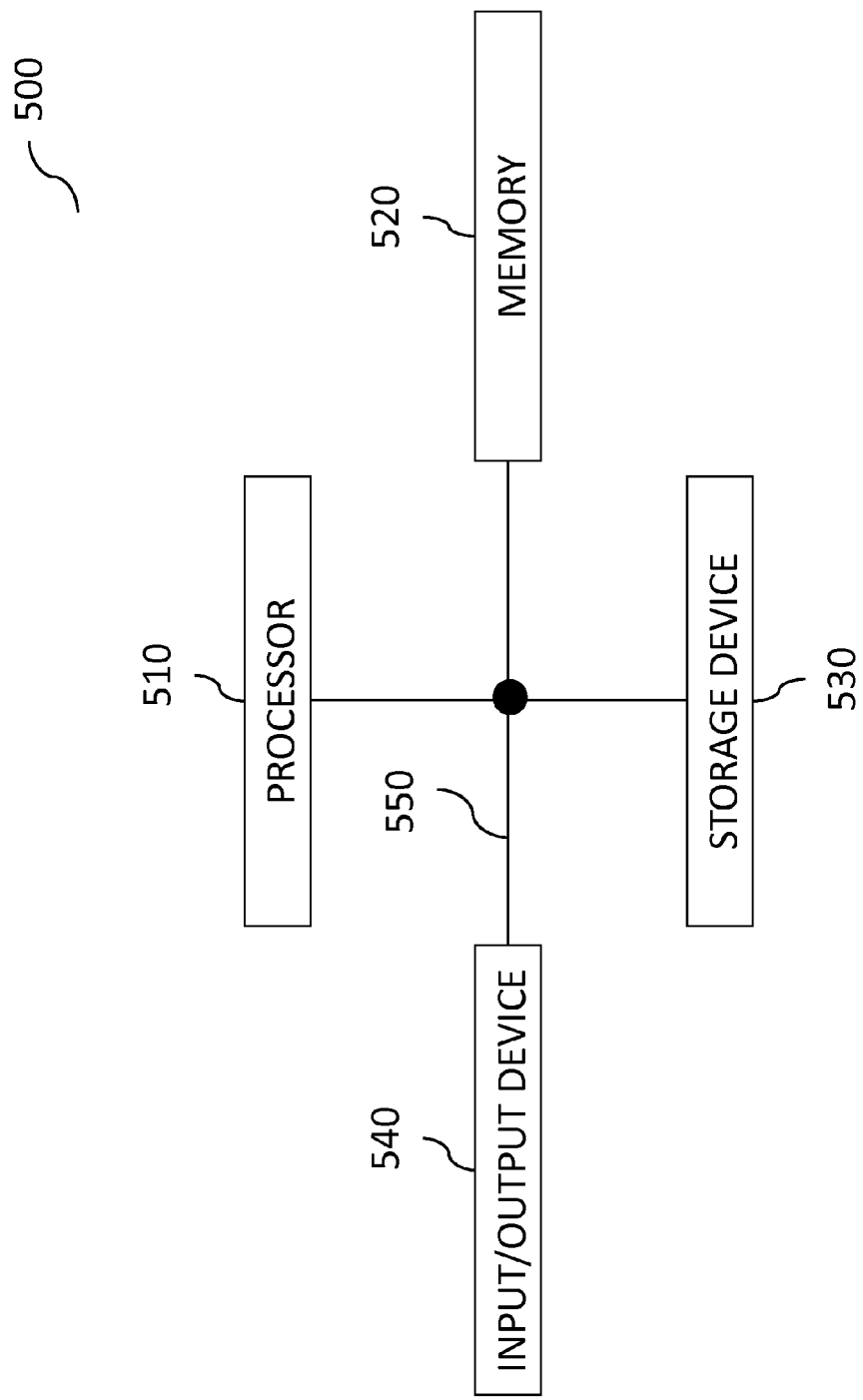
FIG. 5 is an exemplary system, according to some implementations of the current subject matter.

In some implementations, the current subject matter can be configured to be implemented in a system 500, as shown in FIG. 5. The system 500 can include a processor 510, a memory 520, a storage device 530, and an input/output device 540. Each of the components 510, 520, 530 and 540 can be interconnected using a system bus 550. The processor 510 can be configured to process instructions for execution within the system 500. In some implementations, the processor 510 can be a single-threaded processor. In alternate implementations, the processor 510 can be a multi-threaded processor. The processor 510 can be further configured to process instructions stored in the memory 520 or on the storage device 530, including receiving or sending information through the input/output device 540. The memory 520 can store information within the system 500. In some implementations, the memory 520 can be a computer-readable medium. In alternate implementations, the memory 520 can be a volatile memory unit. In yet some implementations, the memory 520 can be a non-volatile memory unit. The storage device 530 can be capable of providing mass storage for the system 500. In some implementations, the storage device 530 can be a computer-readable medium. In alternate implementations, the storage device 530 can be a floppy disk device, a hard disk device, an optical disk device, a tape device, non-volatile solid state memory, or any other type of storage device. The input/output device 540 can be configured to provide input/output operations for the system 500. In some implementations, the input/output device 540 can include a keyboard and/or pointing device. In alternate implementations, the input/output device 540 can include a display unit for displaying graphical user interfaces.

Figure 6:
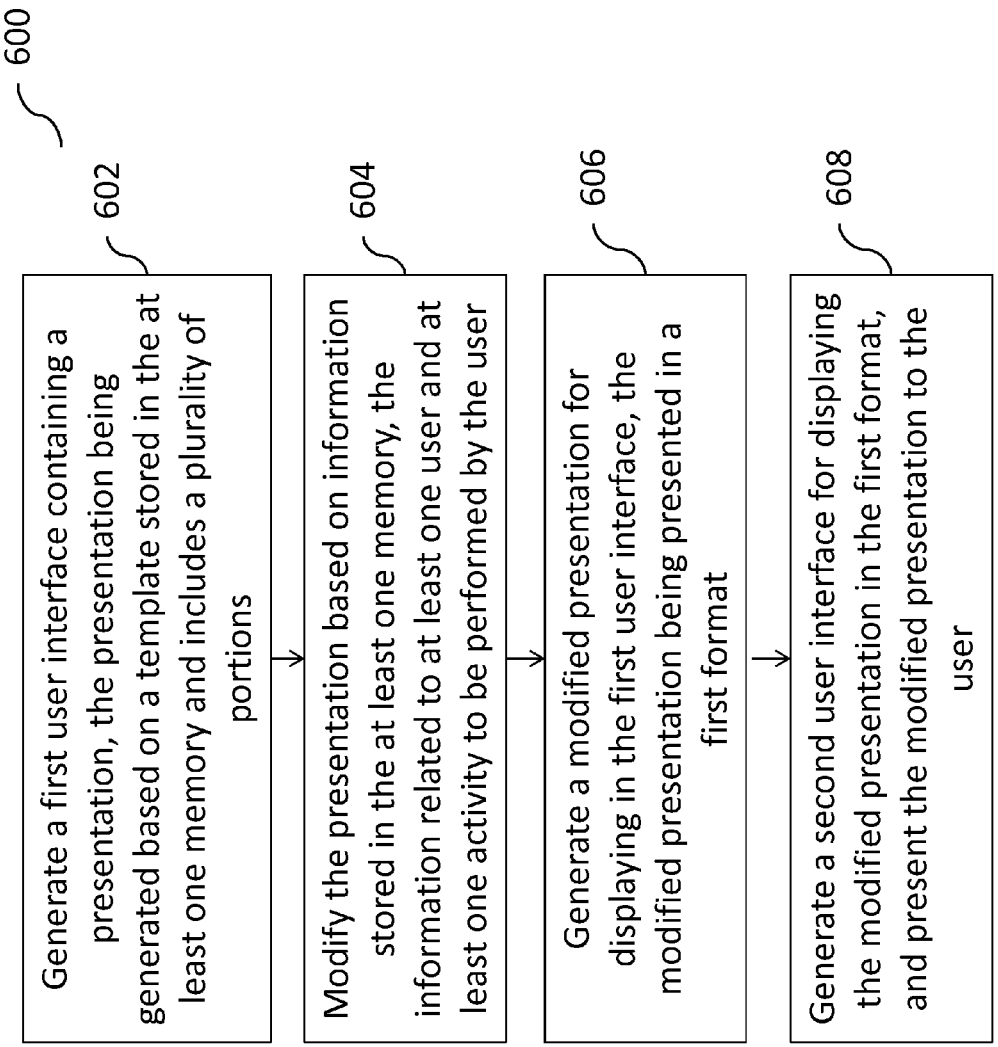
FIG. 6 is an exemplary method, according to some implementations of the current subject matter.

FIG. 6 illustrates an exemplary method 600 for performing configuration of a user interface, such as for example, generating a tour presentation for a user, according to some implementations of the current subject matter. At 602, a first user interface (e.g., an administrator's user interface as shown in FIGS. 3-4) containing a presentation can be generated. The presentation, e.g., a tour, can be generated based on a template (e.g., that can include tiles/slides containing various information as shown in FIGS. 2-4) that can be stored in a memory (e.g., database 108 shown in FIG. 1) and can include a plurality of portions (e.g., tiles/slides, as shown in FIG. 4). At 604, the presentation can be modified by an administrator based on information stored in the memory (e.g., database 108 shown in FIG. 1). The information can be related to a user (e.g., a new employee undergoing an orientation at a company) and at least one activity (e.g., meetings, trainings, form signing, etc.) to be performed by the user. At 606, a modified presentation can be generated and displayed in the first user interface (i.e., an administrator's user interface). The modified presentation can be presented in a first format, i.e., the format that the administrator created the presentation in. At 608, a second user interface (e.g., an interface that is viewable by the user) can be generated for displaying the modified presentation in the same format and presented to the user.

In some implementations, the current subject matter can include one or more of the following optional features. The modification can include at least one of the following: adding at least one portion to the presentation, deleting at least one portion from the presentation, adding data to at least one portion in the presentation, deleting data from at least one portion in the presentation. At least one portion in the presentation can include at least one of the following: text, graphics, audio, video, a link, and a document.

In some implementations, the first user interface is displayed on a first computing device and the second user interface is displayed on a second computing device. An administrative user using the first computing device can perform the modification to the presentation. A non-administrative user (e.g., a new employee) using the second computing device can be prevented from modifying the presentation.

In some implementations, the template can include a predetermined number of portions (e.g., tiles/slides) of the presentation and can be generated based on the information related to the user.

In some implementations, the generated presentation can be valid during a predetermined time period. Upon expiration of the predetermined time, the generated presentation can be deactivated.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   generating, by a processor coupled to at least one memory, a first user interface containing a presentation, the presentation being generated based on a template stored in the at least one memory, the presentation including a plurality of tile objects in a first portion of the first user interface, the presentation further including a duration field in a second portion of the first user interface, the duration field indicating a time duration of the presentation;
   retrieving, by the processor and from a database of the at least one memory, information related to a non-administrative user and at least one activity to be performed by the non-administrative user;
   modifying, by an administrative user via the processor, the presentation based on the information the modifying comprising:
      selecting a tile object of the presentation,
      editing content contained in a field generated in response to the selecting, the field displayed on the first user interface and separate from the tile object, and
      adding at least one tile object to the presentation, wherein the adding changes the time duration of the presentation;
   generating, by the processor and based on the modifying, a modified presentation for displaying in the first user interface, the modified presentation being presented in a first format, wherein the duration field further indicates that the modified presentation is valid during a time period, and wherein upon expiration of the time period, the modified presentation is deactivated;
   generating, by the processor, a second user interface for displaying the modified presentation in the first format;
   providing, by the processor, the modified presentation to the non-administrative user, wherein a first tile object of the modified presentation comprises a list of tasks for the non-administrative user to perform, wherein a second tile object of the modified presentation comprises contact information about the non-administrative user, wherein a third tile object of the modified presentation comprises a schedule of appointments for the non-administrative user to attend;
   receiving, by the processor, an indication that the non-administrative user has completed the at least one activity; and
   deleting, by the processor and based on determining completion of the list of tasks, the first tile object of the modified presentation, wherein the deleting changes the time duration of the presentation.

2. The method according to claim 1, wherein the modifying further comprises changing an order of the plurality of tile objects in the first portion to change an order of the presentation.

3. The method according to claim 1, wherein editing content includes inserting, deleting, and/or changing at least one of the following: text, graphics, audio, video, a link, and a document.

4. The method according to claim 1, wherein the first user interface is displayed on a first computing device and the second user interface is displayed on a second computing device;
   wherein the administrative user using the first computing device performs the modifying, the administrative user granted access to a server for retrieving the information from the database;
   wherein the non-administrative user using the second computing device is prevented from performing the modifying.

5. The method according to claim 1, wherein the template includes a predetermined number of tile objects of the presentation and is generated based on the information related to the user, wherein the presentation comprises a tour of a company for the user, wherein the at least one activity to be performed by the user comprises at least one of a meeting, a training session, a document review, or a document signing.

6. A system comprising:
   at least one programmable processor; and
   a machine-readable medium storing instructions that, when executed by the at least one programmable processor, cause the at least one programmable processor to perform operations comprising:
      generating a first user interface containing a presentation, the presentation being generated based on a template stored in the at least one memory, the presentation including a plurality of tile objects in a first portion of the first user interface, the presentation further including a duration field in a second portion of the first user interface, the duration field indicating a time duration of the presentation;

retrieving from a database, information related to a non-administrative user and at least one activity to be performed by the non-administrative user;

modifying, the presentation based on the information, the modifying comprising:
  selecting a tile object of the presentation,
  editing content contained in a field generated in response to the selecting, the field displayed on the first user interface and separate from the tile object, and
  adding at least one tile object to the presentation, wherein the adding changes the time duration of the presentation;

generating, based on the modifying, a modified presentation for displaying in the first user interface, the modified presentation being presented in a first format, wherein the duration field further indicates that the modified presentation is valid during a time period, and wherein upon expiration of the time period, the modified presentation is deactivated;

generating, by the processor, a second user interface for displaying the modified presentation in the first format;

providing, by the processor, the modified presentation to the non-administrative user, wherein a first tile object of the modified presentation comprises a list of tasks for the non-administrative user to perform, wherein a second tile object of the modified presentation comprises contact information about the non-administrative user, wherein a third tile object of the modified presentation comprises a schedule of appointments for the non-administrative user to attend;

receiving an indication that the non-administrative user has completed the at least one activity; and deleting, based on determining completion of the list of tasks, the first tile object of the modified presentation, wherein the deleting changes the time duration of the presentation.

7. The system according to claim 6, wherein the modifying further comprises changing an order of the plurality of tile objects in the first portion to change an order of the presentation.

8. The system according to claim 6, wherein editing content includes inserting, deleting, and/or changing at least one of the following: text, graphics, audio, video, a link, and a document.

9. The system according to claim 6, wherein the first user interface is displayed on a first computing device and the second user interface is displayed on a second computing device;
  wherein an administrative user using the first computing device performs the modifying, the administrative user granted access to a server for retrieving the information from the database;
  wherein the non-administrative user using the second computing device is prevented from performing the modifying.

10. The system according to claim 6, wherein the template includes a predetermined number of tile objects of the presentation and is generated based on the information related to the user, wherein the presentation comprises a tour of a company for the user, wherein the at least one activity to be performed by the user comprises at least one of a meeting, a training session, a document review, or a document signing.

11. A computer program product comprising a non-transitory machine-readable medium storing instructions that, when executed by at least one programmable processor, cause the at least one programmable processor to perform operations comprising:

generating a first user interface containing a presentation, the presentation being generated based on a template stored in the at least one memory, the presentation including a plurality of tile objects in a first portion of the first user interface, the presentation further including a duration field in a second portion of the first user interface, the duration field indicating a time duration of the presentation;

retrieving, from a database information related to a non-administrative user and at least one activity to be performed by the non-administrative user;

modifying, by an administrative user, the presentation based on the information the modifying comprising:
  selecting a tile object of the presentation,
  editing content contained in a field generated in response to the selecting, the field displayed on the first user interface and separate from the tile object, and
  adding at least one tile object to the presentation, wherein the adding changes the time duration of the presentation;

generating, based on the modifying, a modified presentation for displaying in the first user interface, the modified presentation being presented in a first format, wherein the duration field further indicates that the modified presentation is valid during a time period, and wherein upon expiration of the time period, the modified presentation is deactivated;

generating a second user interface for displaying the modified presentation in the first format;

providing the modified presentation to the non-administrative user, wherein a first tile object of the modified presentation comprises a list of tasks for the non-administrative user to perform, wherein a second tile object of the modified presentation comprises contact information about the non-administrative user, wherein a third tile object of the modified presentation comprises a schedule of appointments for the non-administrative user to attend;

receiving an indication that the non-administrative user has completed the at least one activity;

transmitting the indication to the administrative user; and deleting, based on determining completion of the list of tasks, the first tile object of the modified presentation, wherein the deleting changes the time duration of the presentation.

12. The computer program product according to claim 11, wherein the modifying further comprises changing an order of the plurality of tile objects in the first portion to change an order of the presentation.

13. The computer program product according to claim 11, wherein editing content includes inserting, deleting, and/or changing at least one of the following: text, graphics, audio, video, a link, and a document.

14. The computer program product according to claim 11, wherein the first user interface is displayed on a first computing device and the second user interface is displayed on a second computing device;
    wherein the administrative user using the first computing device performs the modifying, the administrative user granted access to a server for retrieving the information from the database;
    wherein the non-administrative user using the second computing device is prevented from performing the modifying.

15. The computer program product according to claim 11, wherein the template includes a predetermined number of tile objects of the presentation and is generated based on the information related to the user, wherein the presentation comprises a tour of a company for the user, wherein the at least one activity to be performed by the user comprises at least one of a meeting, a training session, a document review, or a document signing.

\* \* \* \* \*